United States Patent
Sayama et al.

(10) Patent No.: US 11,311,961 B2
(45) Date of Patent: Apr. 26, 2022

(54) FRICTION STIR WELDING TOOL

(71) Applicant: HONDA MOTOR CO., LTD., Tokyo (JP)

(72) Inventors: Mitsuru Sayama, Wako (JP); Akiyoshi Miyawaki, Wako (JP); Keisuke Tsuta, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 75 days.

(21) Appl. No.: 16/832,850

(22) Filed: Mar. 27, 2020

(65) Prior Publication Data

US 2020/0306872 A1    Oct. 1, 2020

(30) Foreign Application Priority Data

Mar. 29, 2019    (JP) .............................. JP2019-066160

(51) Int. Cl.
     *B23K 20/00*      (2006.01)
     *B23K 20/12*      (2006.01)

(52) U.S. Cl.
     CPC ................................ *B23K 20/1255* (2013.01)

(58) Field of Classification Search
     CPC ............ B23K 20/1255; B23K 20/1225; B23K 20/1265; B23K 20/129; B23K 2101/24; B23K 2101/36
     See application file for complete search history.

(56) References Cited

U.S. PATENT DOCUMENTS

| | | | |
|---|---|---|---|
| 6,510,975 B2 | 1/2003 | Enomoto | |
| 8,104,664 B2 * | 1/2012 | Kato | B23K 20/1265 228/112.1 |
| 8,955,415 B2 * | 2/2015 | Lin | B25B 27/18 81/53.2 |
| 10,442,030 B2 * | 10/2019 | Severson | B23K 20/1225 |
| 2008/0251571 A1 * | 10/2008 | Burford | B23K 20/1255 228/114.5 |

FOREIGN PATENT DOCUMENTS

| | | |
|---|---|---|
| CN | 102049610 A | 5/2011 |
| CN | 108356406 A | 8/2018 |
| JP | 2001-340976 A | 12/2001 |
| JP | 2007-175764 A | 7/2007 |
| JP | 2008-307606 A | 12/2008 |

OTHER PUBLICATIONS

Office Action including search report dated Jun. 9, 2021 issued over the corresponding Chinese Patent Application Mo. 202010230735.9 with a partial English translation thereof.
Office Action dated Mar. 1, 2022 issued over the corresponding Japanese Patent Application No. 2019-066160 and English translation thereof.

\* cited by examiner

*Primary Examiner* — Erin B Saad
(74) *Attorney, Agent, or Firm* — Carrier Blackman & Associates, P.C.; Joseph P. Carrier; Fulchand P. Shende

(57) ABSTRACT

A friction stir welding tool includes a probe having a front end surface and an outer circumferential surface. The probe has, formed therein, outer circumferential recesses extending to the front end surface along a rotation axis. The friction stir welding tool rotates the probe about the rotation axis and embeds the probe inside a workpiece during rotation of the probe to thereby weld the workpiece. The width of the outer circumferential recesses is increased toward a front end of the probe.

6 Claims, 7 Drawing Sheets

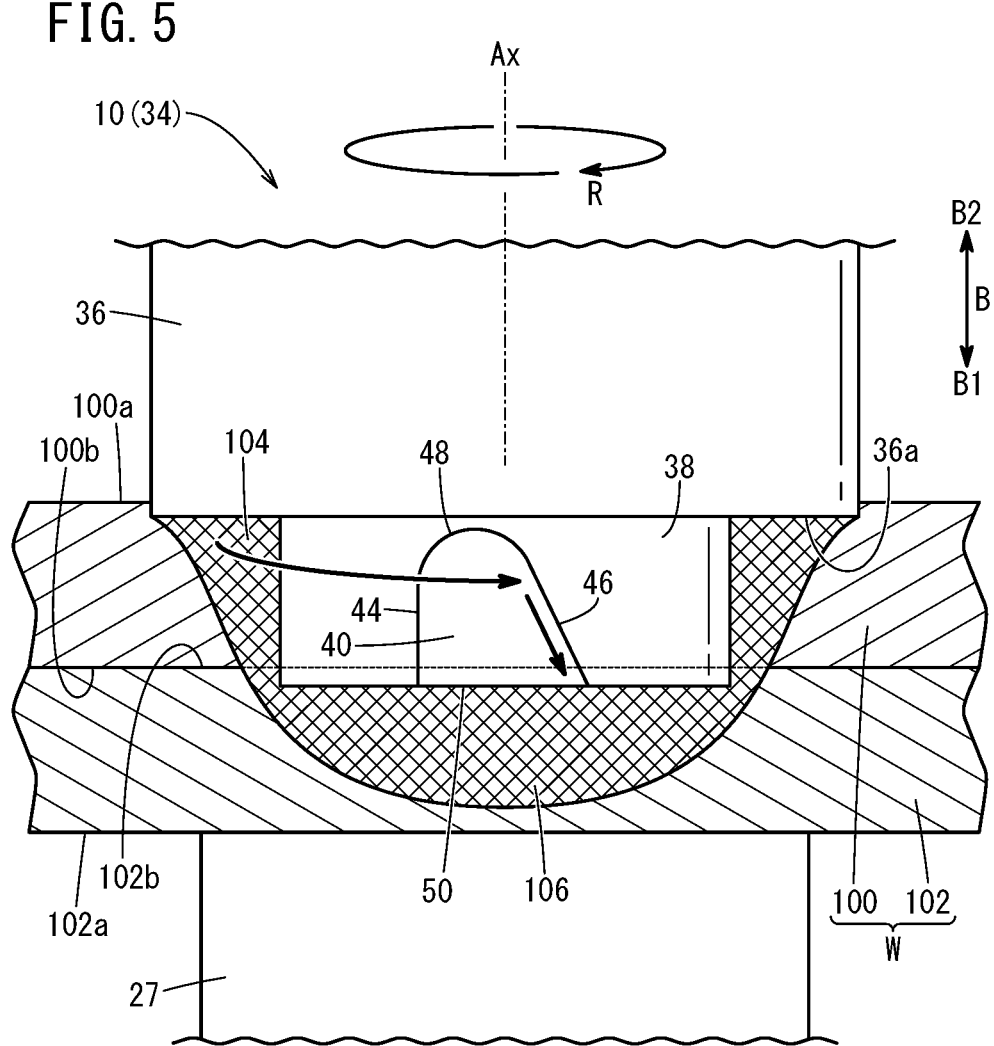

FRICTION STIR WELDING TOOL

CROSS-REFERENCE TO RELATED APPLICATION

This application is based upon and claims the benefit of priority from Japanese Patent Application No. 2019-066160 filed on Mar. 29, 2019, the contents of which are incorporated herein by reference.

BACKGROUND OF THE INVENTION

Field of the Invention

The present invention relates to a friction stir welding tool which includes a probe having a front end surface and an outer circumferential surface, and welds a workpiece by rotating the probe about a rotation axis and embedding the probe inside the workpiece during rotation of the probe.

Description of the Related Art

Japanese Laid-Open Patent Publication No. 2008-307606 discloses, in FIG. 9 and paragraph [0007], a friction stir welding tool having outer circumferential recesses extending along a rotation axis of a probe in an outer circumferential surface of the probe. The outer circumferential recesses have a constant width over the entire length of the outer circumferential recesses.

SUMMARY OF THE INVENTION

In the above described friction stir welding tool, material softened by friction heat of the probe is taken into the outer circumferential recesses from a lateral side of the probe for allowing the softened material to flow plastically toward the front end of the probe. However, since the outer circumferential recesses have a constant width over the entire length of the outer circumferential recesses, the volume of material which can be taken into the outer circumferential recesses is relatively small. Therefore, it may not be possible to sufficiently stir the softened material by the probe, and achieve the suitable welding quality.

The present invention has been made taking such a problem into consideration, and an object of the present invention is to provide a friction stir welding tool which makes it possible to achieve the suitable welding quality.

According to an aspect of the present invention, there is provided a friction stir welding tool including a probe having a front end surface and an outer circumferential surface. The outer circumferential surface includes, formed therein, an outer circumferential recess extending to the front end surface along a rotation axis of the probe, and the friction stir welding tool is configured to rotate the probe about the rotation axis and embed the probe inside a workpiece during rotation of the probe to thereby weld the workpiece. The width of the outer circumferential recess is increased toward a front end of the probe.

In the present invention, the width of the outer circumferential recess is increased toward the front end of the probe. Therefore, in comparison with the case where the outer circumferential recess has a constant width, it is possible to increase the quantity (volume) of softened material taken into the outer circumferential recess. Accordingly, since it is possible to increase the efficiency of stirring the softened material, it is possible to achieve the suitable welding quality.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is a cross sectional view showing lap welding in FIG. 4;

DESCRIPTION OF THE PREFERRED EMBODIMENTS

Hereinafter, preferred embodiments of a friction stir welding tool according to the present invention will be described in relation to a friction stir welding system with reference to the accompanying drawings.

Figure 1:
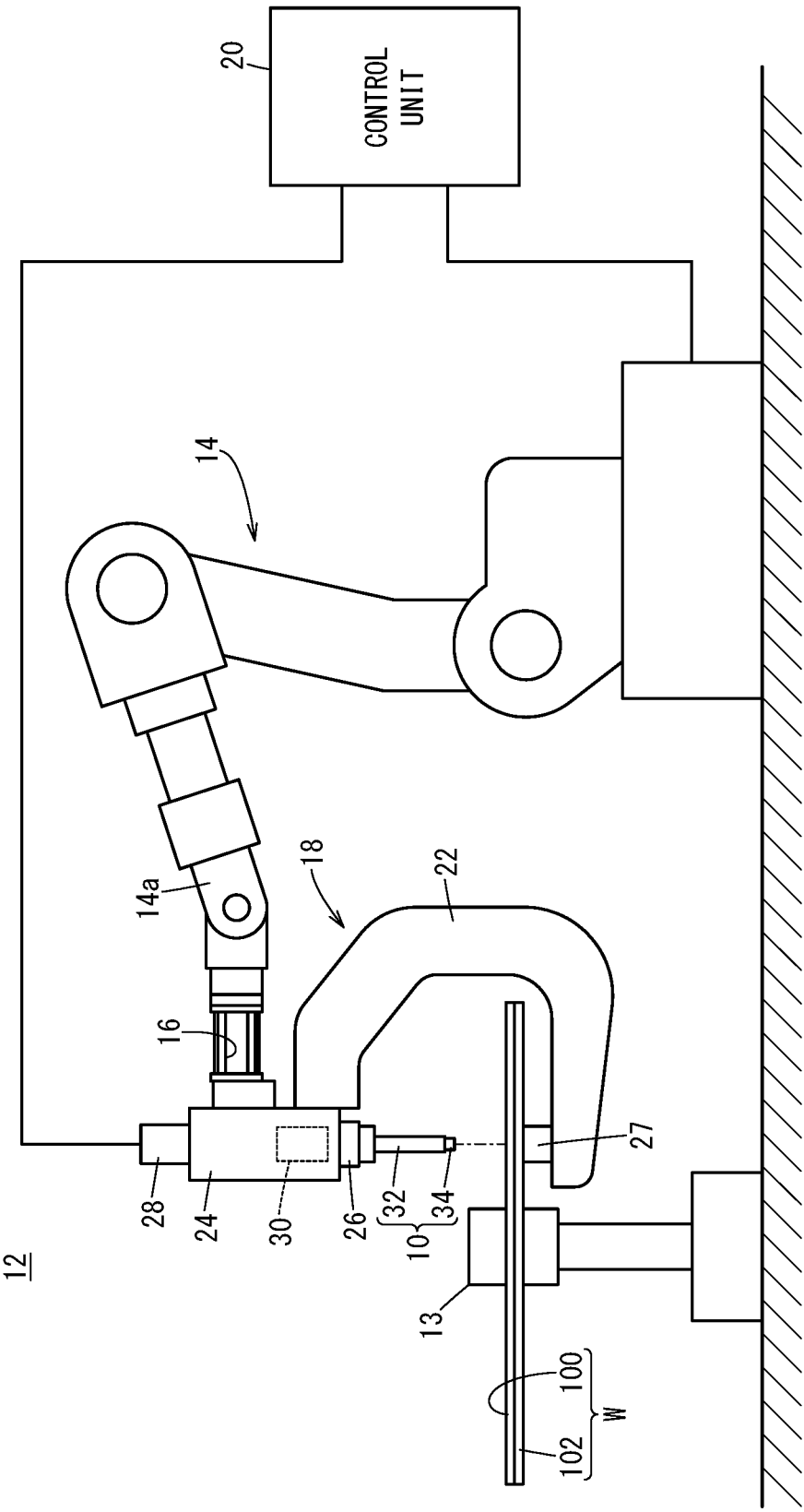
FIG. 1 is a view schematically showing overall structure of a friction stir welding system including a friction stir welding tool according to an embodiment of the present invention.

As shown in FIG. 1, a friction stir welding system 12 is configured to perform friction stir welding (FSW) of a workpiece W by, while rotating a friction stir welding tool 10 (hereinafter also referred to as the "welding tool 10", pressing the friction stir welding tool 10 against the workpiece W.

For example, the workpiece W includes a first member 100 in the form of a plate, and a second member 102 in the form of a plate. In the state where the first member 100 and the second member 102 are stacked together, the workpiece W is fixed to a fixing base 13.

Each of the first member 100 and the second member 102 is made of metal material such as aluminum, magnesium, copper, iron, titanium, or alloy of these materials, etc. The first member 100 and the second member 102 may be made of the same material, or may be made of different materials. It should be noted that at least one of the first member 100 and the second member 102 may be made of resin material. The size and the shape of the first member 100 and the second member 102 may be determined as necessary.

The friction stir welding system 12 includes an industrial multi-joint robot 14, a welding device body 18 provided at a front end of a robot arm 14a of the robot 14 through a connector 16, the welding tool 10 detachably attached to the welding device body 18, and a control unit 20 which controls the entire system totally.

The robot 14 adjusts the position and the orientation of the welding device body 18 relative to the workpiece W to move the welding tool 10 relative to the workpiece W. Specifically, in the case of performing line welding of the workpiece W, the robot 14 adjusts the position and the orientation of the welding device body 18 in a manner that the welding tool 10 moves in a welding direction (in a direction indicated by an arrow F in FIG. 4) relative to the workpiece W. That is, the robot 14 functions as means for moving and tilting the welding tool 10.

The welding device body 18 includes a C-shaped support arm 22, a drive unit 24 provided at one end of the support arm 22, a chuck 26 provided for the drive unit 24 to clamp the welding tool 10, and a receiver member 27 provided at the other end of the support arm 22.

Figure 2:
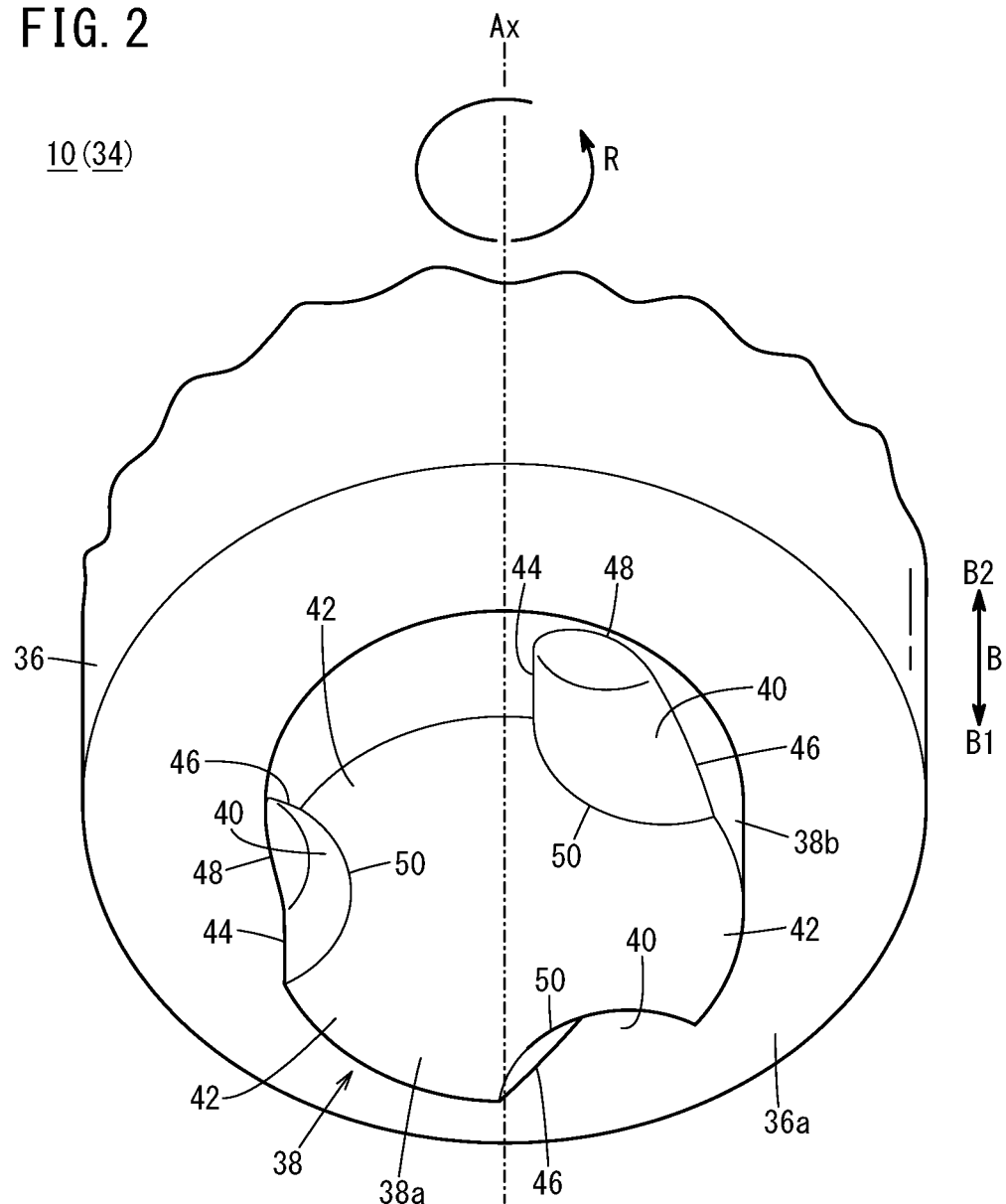
FIG. 2 is a partial perspective view showing the friction stir welding tool.

The drive unit 24 includes a rotary motor 28 for rotating the welding tool 10 attached to the chuck 26 in a predetermined rotation direction (in a direction indicated by an arrow R in FIG. 2), and an actuator 30 for moving the welding tool 10 back and forth in a direction of a rotation axis Ax (in a direction indicated by an arrow B in FIG. 2). At the time of performing friction stir welding of the workpiece W, the receiver member 27 is positioned opposite to the chuck 26 (welding tool 10) such that the workpiece W is positioned between the receiver member 27 and the chuck 26. The receiver member 27 receives a pressing force (pressure force) applied from the welding tool 10 to the workpiece W.

The welding tool 10 includes a substantially hollow-cylindrical holder 32 and a tool 34 detachably attached to the holder 32. The proximal end of the holder 32 is clamped by the chuck 26. The tool 34 can be attached to a front end of the holder 32 coaxially with the holder 32. The tool 34 is consumable. When the tool 34 is worn out as a result of friction stir welding, the tool 34 is replaced with new one.

Figure 3A:
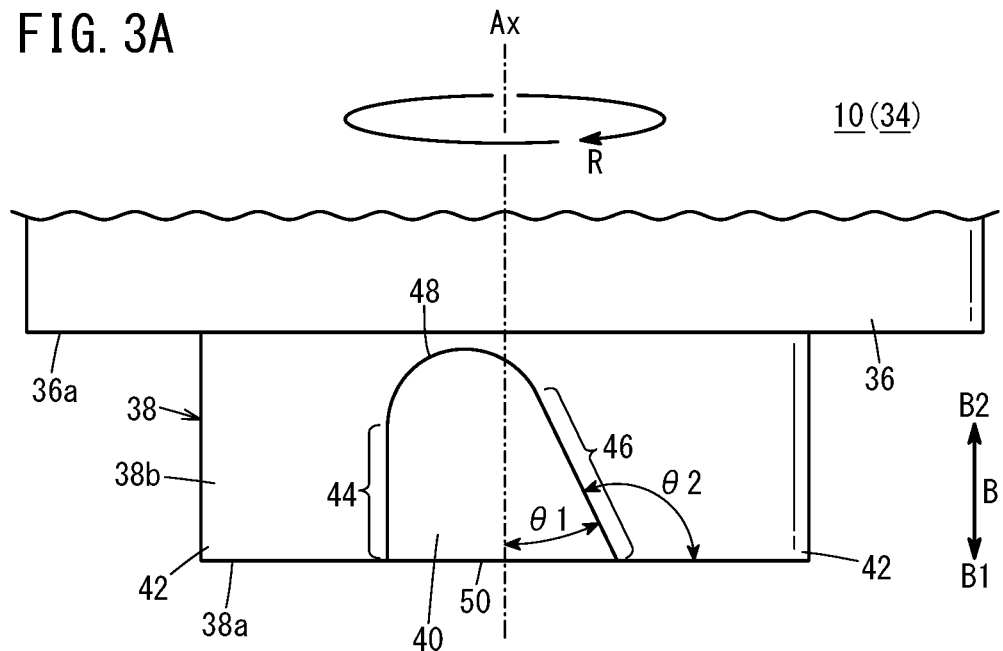
FIG. 3A is a side view showing the friction stir welding tool in FIG. 2.
Figure 3B:
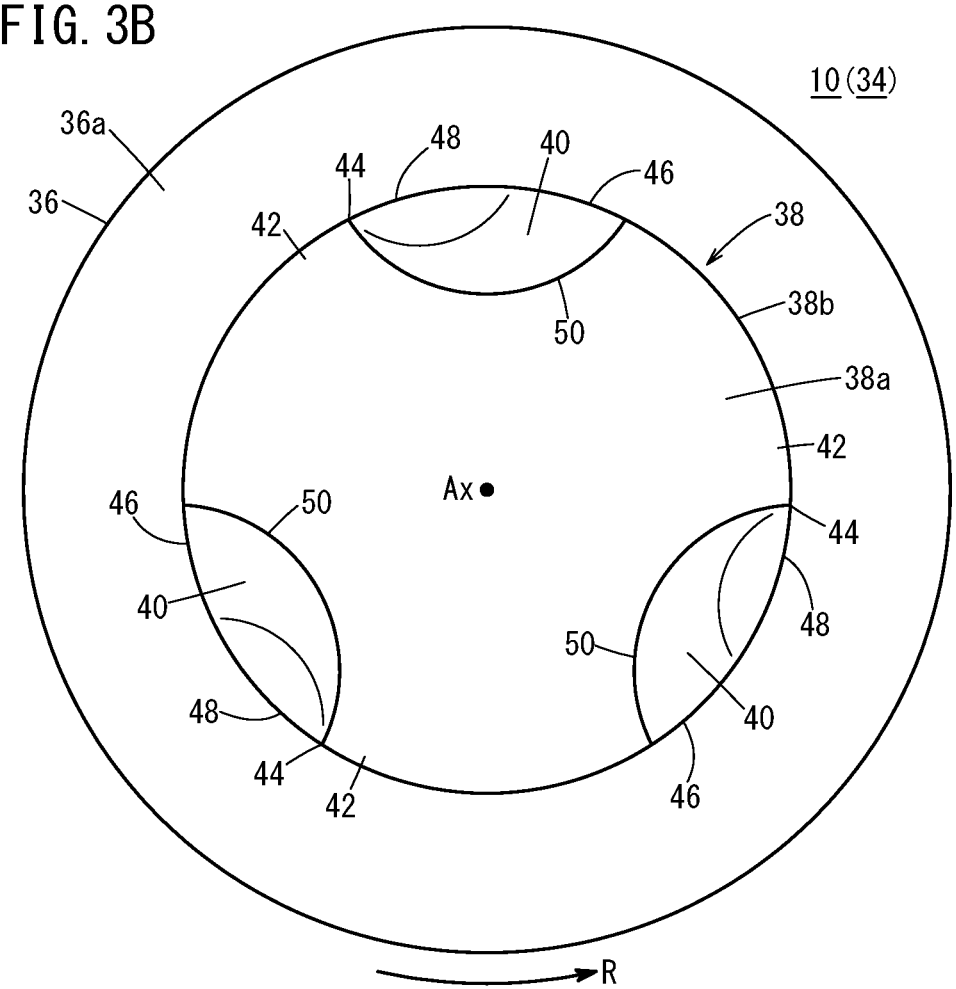
FIG. 3B is a view showing the friction stir welding tool in FIG. 2, where the friction stir welding tool is viewed from a front end.

As shown in FIGS. 2 to 3B, the tool 34 includes a substantially cylindrical shoulder 36, and a small diameter probe 38 provided on a front end surface 36*a* of the shoulder 36. The welding tool 10 welds the workpiece W by rotating the probe 38 in the direction indicated by the arrow R about the rotation axis Ax and embedding the probe 38 inside the workpiece W during rotation of the probe 38.

The tool 34 is produced by machining (cutting) cylindrical metal material. It should be noted that the tool 34 may be produced by a method other than machining (e.g., by means of casting, stacking, etc.). Examples of materials suitably employed in the tool 34 include tool steels having hardness higher than that of the workpiece W, and having excellent heat resistance and wear resistance. It should be noted that the materials of the tool 34 are not limited to the tool steels, and can be determined as necessary.

The proximal end (end in a direction indicated by an arrow B2) of the shoulder 36 is detachably attached to the holder 32 (see FIG. 1). The front end surface 36*a* of the shoulder 36 (end surface in a direction indicated by an arrow B1) has a flat shape (see FIGS. 2 and 3A).

The probe 38 protrudes from the front end surface 36*a* of the shoulder 36 in a front end direction (indicated by the arrow B1) (see FIGS. 2 and 3A). The probe 38 is provided coaxially with the shoulder 36. The outer diameter and the protruding length of the probe 38 can be determined as necessary depending on the shape, the size, the material, etc. of the workpiece W as a welding target.

The probe 38 has a cylindrical shape, and includes a front end surface 38*a* and an outer circumferential surface 38*b*.

The front end surface 38*a* of the probe 38 is a flat surface. It should be noted that a recess depressed toward a proximal end (i.e., in a direction indicated by an arrow B2) may be formed in the front end surface 38*a* of the probe 38.

A plurality of (three in the illustrated embodiment) outer circumferential recesses 40 (side surface grooves) extending to the front end surface 38*a* along the rotation axis Ax of the probe 38 are formed in the outer circumferential surface 38*b* of the probe 38. The plurality of outer circumferential recesses 40 are arranged at equal intervals of angle (at intervals of 120° in the illustrated embodiment) in a circumferential direction of the probe 38 (see FIGS. 2 and 3B). The width of each of the outer circumferential recesses 40 is increased from the outer circumferential surface 38*b* toward the front end surface 38*a* of the probe 38. The proximal end of each of the outer circumferential recesses 40 is positioned adjacent to the proximal end of the probe 38.

The probe 38 has claws 42 between the outer circumferential recesses 40 that are adjacent to each other in the circumferential direction of the probe 38. Stated otherwise, the number of the claws 42 of the probe 38 corresponds to the number of the outer circumferential recesses 40. The width of each of the claws 42 in the circumferential direction of the probe 38 is decreased from the proximal end to the front end (see FIG. 2).

In FIGS. 2 and 3A, first outer circumferential edges 44, second outer circumferential edges 46, and third outer circumferential edges 48 are formed on the outer circumferential surface 38*b* of the probe 38. The first outer circumferential edge 44 forms an edge portion of each of the outer circumferential recesses 40 that is positioned on the forward side in the rotation direction of the probe 38 (indicated by an arrow R). The first outer circumferential edge 44 extends in parallel to the rotation axis Ax of the probe 38. The proximal end (one end indicated by the arrow B2) of the first outer circumferential edge 44 is positioned closer to the proximal end side than the center of the probe 38 in the direction indicated by the arrow B. The front end of the first outer circumferential edge 44 (the other end in the direction indicated by the arrow B1) is positioned at the front end surface 38*a* of the probe 38.

The second outer circumferential edge 46 forms an edge portion of each of the outer circumferential recesses 40 that is positioned on the backward side in the rotation direction of the probe 38 (i.e., in a direction opposite to the direction indicated by the arrow R). The second outer circumferential edge 46 extends toward the front end of the probe 38 with inclination toward the backward side in the rotation direction. The second outer circumferential edge 46 extends straight. The proximal end (one end indicated by the arrow B2) of the second outer circumferential edge 46 is positioned closer to the proximal end side than the center of the probe 38 in the direction indicated by the arrow B. The front end of the second outer circumferential edge 46 (the other end in the direction indicated by the arrow B1) is positioned at the front end surface 38*a* of the probe 38.

As viewed in a direction perpendicular to the rotation axis Ax of the probe 38 (lateral side of the probe 38), the inclination angle θ1 at which the second outer circumferential edge 46 is inclined from the rotation axis Ax of the probe 38 can be determined as necessary. It should be noted that the angle θ2 defined between the second outer circumferential edge 46 and the front end surface 38*a* of the probe 38 is an obtuse angle.

The third outer circumferential edge 48 forms an edge portion of each of the outer circumferential recesses 40 that is positioned in the proximal end direction (indicated by the arrow B2) of the probe 38. The third outer circumferential edge 48 couples the proximal end of the first outer circumferential edge 44 and the proximal end of the second outer circumferential edge 46 together. The third outer circumferential edge (edge line) 48 is curved so as to be convex in the direction indicated by the arrow B2. Stated otherwise, the third outer circumferential edge 48 has an inverted U-shape as viewed in the direction perpendicular to the rotation axis Ax of the probe 38 (i.e., as viewed from the lateral side of the probe 38).

As shown in FIG. 2 to FIG. 3B, a front end edge 50 is formed in the front end surface 38a of the probe 38. The front end edge 50 forms a front end edge portion of the outer circumferential recess 40. The front end edge 50 couples the front end of the first outer circumferential edge 44 and the front end of the second outer circumferential edge 46 together. The front end edge (edge line) 50 is curved so as to be convex inward, i.e., convex toward the rotation axis Ax of the probe 38. The curvature of the front end edge 50 can be appropriately set. The front end edge 50 may extend straight from the front end of the first outer circumferential edge 44 to the front end of the second outer circumferential edge 46.

Next, an example of lap welding the first member 100 (e.g., an iron plate) and the second member 102 (an aluminum alloy plate) of the workpiece W together using the above described welding tool 10 will be described.

Figure 4:
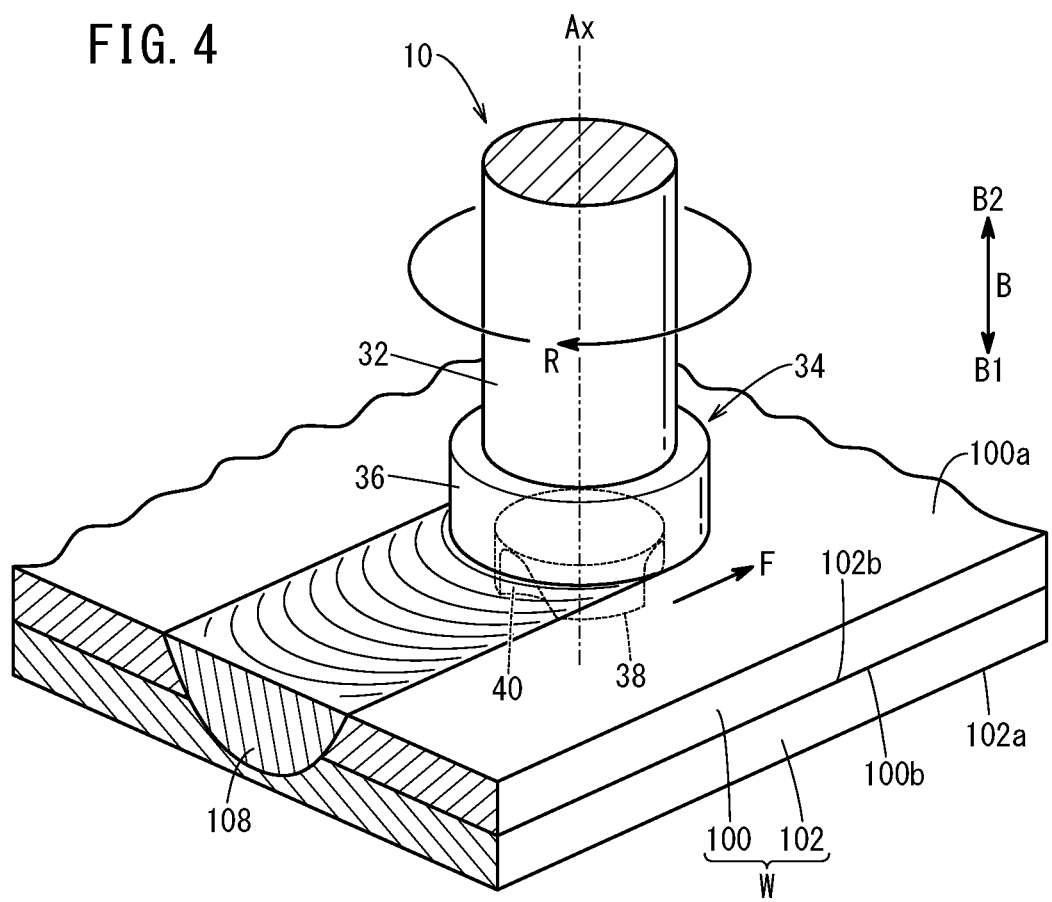
FIG. 4 is a perspective view showing lap welding using the friction stir welding tool shown in FIG. 2.

In this case, in FIG. 1, in the state where the first member 100 and the second member 102 are stacked together, the workpiece W is fixed to the fixing base 13. Specifically, as shown in FIGS. 4 and 5, one surface (first outer surface 100a) of the first member 100 is positioned on the shoulder 36 side. The other surface (first inner surface 100b) of the first member 100 contacts one surface (second inner surface 102b) of the second member 102. The other surface (second outer surface 102a) of the second member 102 contacts the receiver member 27.

Then, the control unit 20 controls driving of the drive unit 24 to move the welding tool 10 toward the workpiece W (in the direction indicated by the arrow B1) while rotating the welding tool 10, and presses the front end surface 38a of the probe 38 against the first outer surface 100a of the first member 100.

As a result, as shown in FIG. 5, the probe 38 is inserted into the first member 100 while the probe 38 is machining the first member 100. At this time, since frictional heat is produced between the probe 38 and the first member 100, the portion of the first member 100 around the probe 38 is softened.

Then, when the front end surface 38a of the probe 38 reaches the second inner surface 102b of the second member 102, the probe 38 is inserted into the second member 102 while the probe 38 is machining the second member 102. At this time, since frictional heat is produced between the probe 38 and the second member 102 and the frictional heat produced in the first member 100 is transmitted to the second member 102, the portion of the second member 102 around the probe 38 is softened. Then, the probe 38 is embedded in the workpiece W completely, and the front end surface 36a of the shoulder 36 is brought into contact with the first outer surface 100a of the first member 100.

The softened portion of the first member 100 (first softened material 104) and the softened portion of the second member 102 (second softened material 106) are dragged by rotation of the probe 38 to flow plastically, and stirred together (mixed together).

Specifically, when the probe 38 is rotated, the first softened material 104 present on the lateral side of the probe 38 is taken into each of the outer circumferential recesses 40. At this time, a welding interface (fresh surface) is formed in the second member 102 as a result of machining the second member 102 by the front end edge 50 and the second outer circumferential edge 46 of the probe 38. Then, the first softened material 104 taken in the outer circumferential recess 40 flows plastically along inclination of the second outer circumferential edge 46 by a rotational force of the probe 38 toward the front end of the probe 38 (in the direction indicated by the arrow B1). That is, the first softened material 104 in the outer circumferential recess 40 is guided to the welding interface of the second member 102 while discharging the second softened material 106 taken into the outer circumferential recess 40. As a result, in the welding interface which is present on the front end side of the probe 38, the first softened material 104 and the second softened material 106 are stirred together.

Then, as shown in FIG. 4, by moving the welding tool 10 in the welding direction (in the direction indicated by an arrow F) while maintaining rotation and pressing of the welding tool 10, the first member 100 and the second member 102 are welded together integrally by friction stir welding. As a result, a joint portion 108 (joint bead) is formed in the workpiece W.

In this case, the welding tool 10 according to the embodiment of the present invention offers the following advantages.

The width of the outer circumferential recesses 40 is increased toward the front end of the probe 38 (in the front end direction of the probe 38).

In the structure, in comparison with the case where the outer circumferential recess 40 has a constant width, it is possible to increase the amount (volume) of the first softened material 104 which can be taken into the outer circumferential recess 40. As a result, since it is possible to improve the efficiency of stirring the first softened material 104 and the second softened material 106 together, it is possible to achieve the suitable welding quality.

The probe 38 includes the first outer circumferential edge 44 forming the edge portion of the outer circumferential recess 40 that is positioned on the forward side in the rotation direction of the probe 38 and the second outer circumferential edge 46 forming the edge portion of the outer circumferential recess 40 that is positioned on the backward side in the rotation direction of the probe 38. The first outer circumferential edge 44 extends along the rotation axis Ax, and the second outer circumferential edge 46 extends toward the front end of the probe 38 with inclination toward the backward side in the rotation direction of the probe 38.

In the structure, it is possible to generate plastic flow of the first softened material 104 taken into the outer circumferential recess 40 toward the front end of the probe 38 along the second outer circumferential edge 46 by the rotation force of the probe 38. Accordingly, it is possible to achieve further improvement of the stirring efficiency. Further, since it is possible to reduce the pressing force (pressure force) of the probe 38 applied to the workpiece W, it is possible to improve the durability of the welding tool 10. Further, since the angle θ2 formed between the second outer circumferential edge 46 and the front end surface 38a of the probe 38 can be an obtuse angle, it is possible to effectively increase the rigidity (strength) of the front end corner of the second outer circumferential edge 46. Accordingly, it is possible to achieve further improvement in the durability of the probe 38.

The probe 38 includes the third outer circumferential edge 48. The third outer circumferential edge 48 couples the proximal end of the first outer circumferential edge 44 and the proximal end of the second outer circumferential edge 46, and the third outer circumferential edge (edge line) 48 is curved so as to be convex toward the proximal end of the probe 38.

In the structure, it is possible to smoothly flow material present on the lateral side of the probe 38, into the outer circumferential recess 40.

The plurality of outer circumferential recesses 40 are provided in the circumferential direction of the probe 38.

In the structure, it is possible to more smoothly flow material present on the lateral side of the probe 38, into the outer circumferential recesses 40.

First Modified Embodiment

Next, a probe 38A according to a first modified embodiment will be described. In the description of the probe 38A, constituent elements having the structure identical to that of the probe 38 are labeled with the same reference numerals, and description thereof is omitted. Further, in the probe 38A, the structure similar to that of the probe 38 offers similar effects and advantages. Also in the description of a probe 38B according to a second modified embodiment described later, constituent elements having the structure identical to that of the probe 38 are labeled with the same reference numerals, and description thereof is omitted. Further, in the probe 38B, the structure similar to that of the probe 38 offers similar effects and advantages.

Figure 6A:
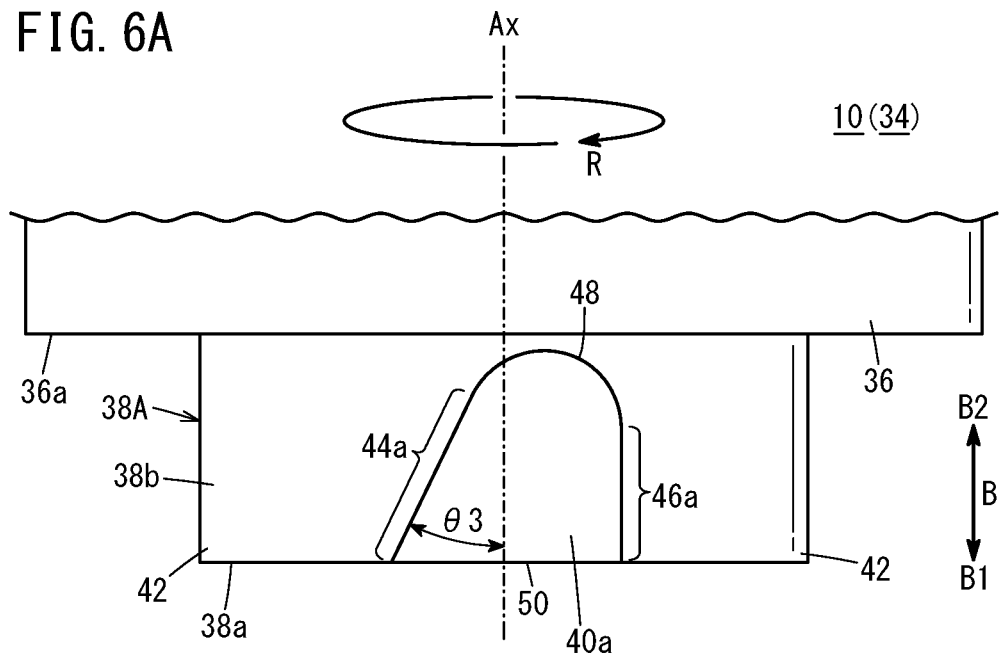
FIG. 6A is a view where a friction stir welding tool including a probe according to a first modified embodiment is viewed from a front end.

As shown in FIG. 6A, the probe 38A includes an outer circumferential recess 40a instead of the outer circumferential recess 40. The width of the outer circumferential recess 40a is increased toward the front end of the probe 38A. The probe 38A includes a first outer circumferential edge 44a, a second outer circumferential edge 46a, a third outer circumferential edge 48, and the front end edge 50.

The first outer circumferential edge 44a forms an edge portion of the outer circumferential recess 40a that is positioned on the forward side in the rotation direction of the probe 38A (in the direction indicated by the arrow R). The first outer circumferential edge 44a extends toward the front end of the probe 38A with inclination toward the forward side in the rotation direction of the probe 38A. The first outer circumferential edge 44a extends straight. As viewed from the lateral side of the probe 38A, the inclination angle θ3 at which the first outer circumferential edge 44a is inclined from the rotation axis Ax of the probe 38A is set in the same manner as the above described inclination angel θ1 of the probe 38.

The second outer circumferential edge 46a forms an edge portion of the outer circumferential recess 40a that is positioned on the backward side in the rotation direction of the probe 38A (in the direction opposite to the direction indicated by the arrow R). The second outer circumferential edge 46a extends along the rotation axis Ax of the probe 38A.

In the first modified embodiment, the probe 38A includes the first outer circumferential edge 44a forming the edge portion of the outer circumferential recess 40a that is positioned on the forward side in the rotation direction of the probe 38A, and the second outer circumferential edge 46a forming the edge portion of the outer circumferential recess 40a that is positioned on the backward side in the rotation direction of the probe 38A. The first outer circumferential edge 44a extends toward the front end of the probe 38A with inclination toward the forward side in the rotation direction of the probe 38A, and the second outer circumferential edge 46a extends along the rotation axis Ax of the probe 38A.

Figure 6B:
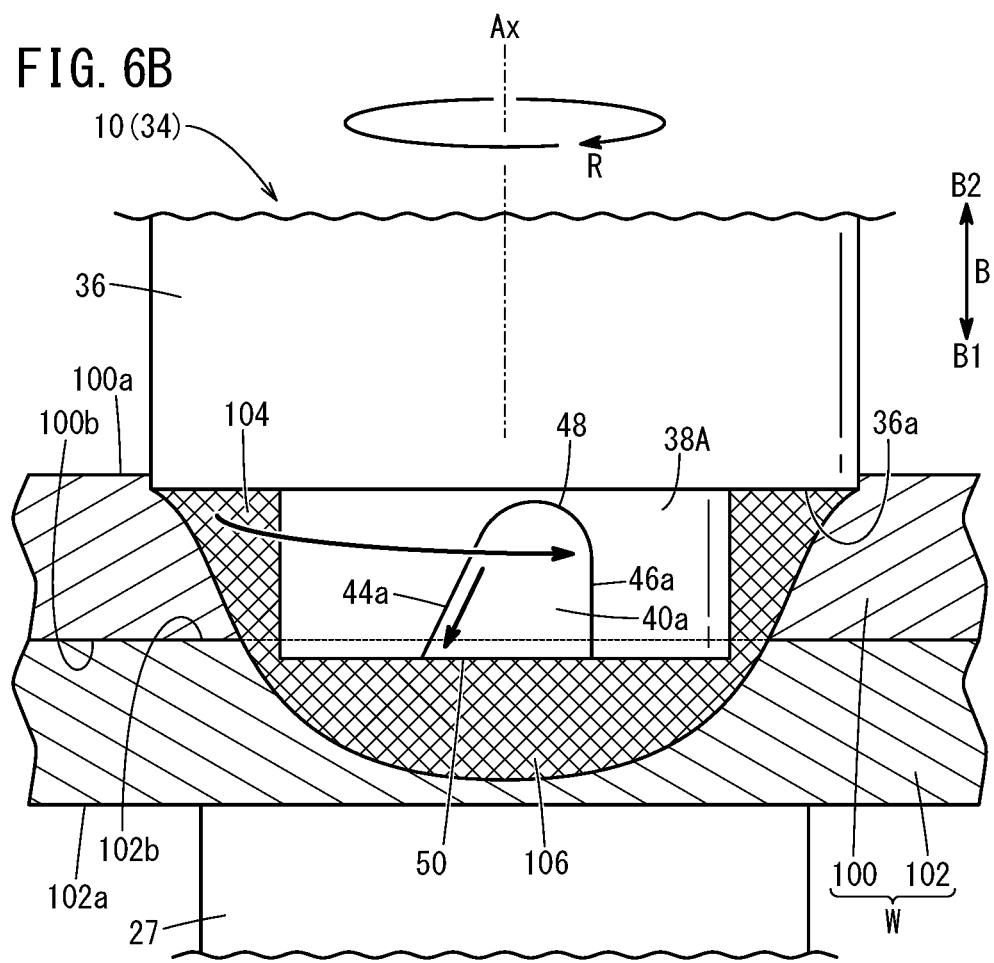
FIG. 6B is cross sectional view showing lap welding using the friction stir welding tool in FIG. 6A.

In the structure, as shown in FIG. 6B, it is possible to generate plastic flow of the first softened material 104 taken into the outer circumferential recess 40a toward the front end of the probe 38A along the first outer circumferential edge 44a by the rotation force of the probe 38A. Accordingly, it is possible to improve the efficiency of stirring the first softened material 104 and the second softened material 106 together.

Second Modified Embodiment

Figure 7A:
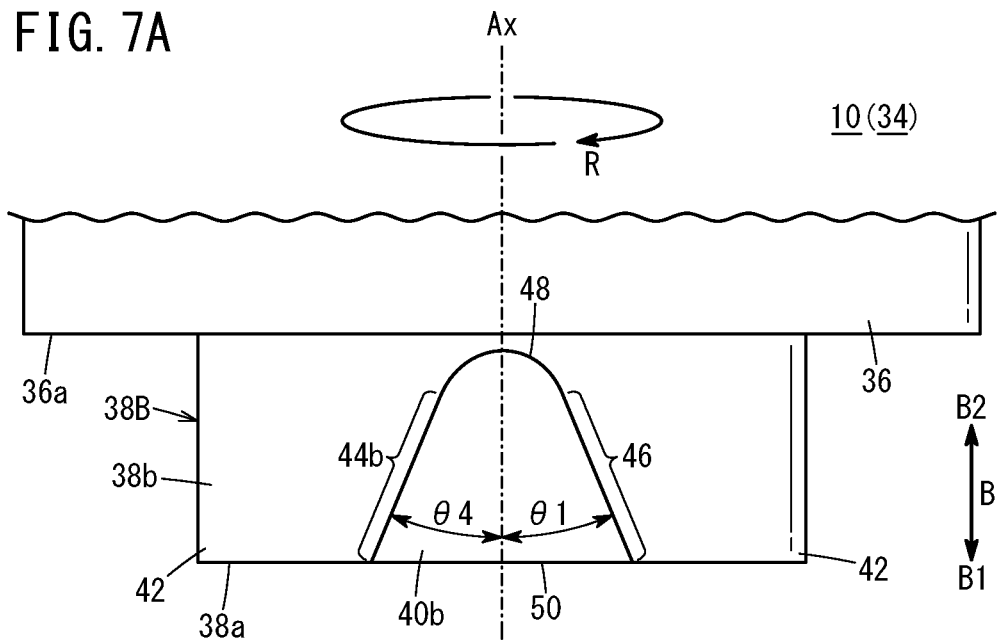
FIG. 7A is a side view showing a friction stir welding tool including a probe according to a second modified embodiment.

Next, the probe 38B according to the second modified embodiment will be described. As shown in FIG. 7A, the probe 38B includes an outer circumferential recess 40b instead of the outer circumferential recess 40. The width of the outer circumferential recess 40b is increased toward the front end of the probe 38B. The probe 38B includes a first outer circumferential edge 44b, a second outer circumferential edge 46, a third outer circumferential edge 48, and the front end edge 50.

The first outer circumferential edge 44b forms an edge portion of the outer circumferential recess 40b that is positioned on the forward side in the rotation direction of the probe 38B. The first outer circumferential edge 44b extends toward the front end of the probe 38B with inclination toward the forward side in the rotation direction of the probe 38B. The first outer circumferential edge 44b extends straight. As viewed from the lateral side of the probe 38B, the inclination angle θ4 at which the first outer circumferential edge 44b is inclined from the rotation axis Ax of the probe 38B is set in the same manner as the inclination angle θ1.

In the second modified embodiment, the probe 38B includes the first outer circumferential edge 44b forming the edge portion of the outer circumferential recess 40b that is positioned on the forward side in the rotation direction of the probe 38B, and the second outer circumferential edge 46 forming the edge portion of the outer circumferential recess 40b that is positioned on the backward side in the rotation direction of the probe 38B. The first outer circumferential edge 44b extends toward the front end of the probe 38B with inclination toward the forward side in the rotation direction of the probe 38B, and the second outer circumferential edge 46 extends toward the front end of the probe 38B with inclination toward the backward side in the rotation direction of the probe 38B.

Figure 7B:
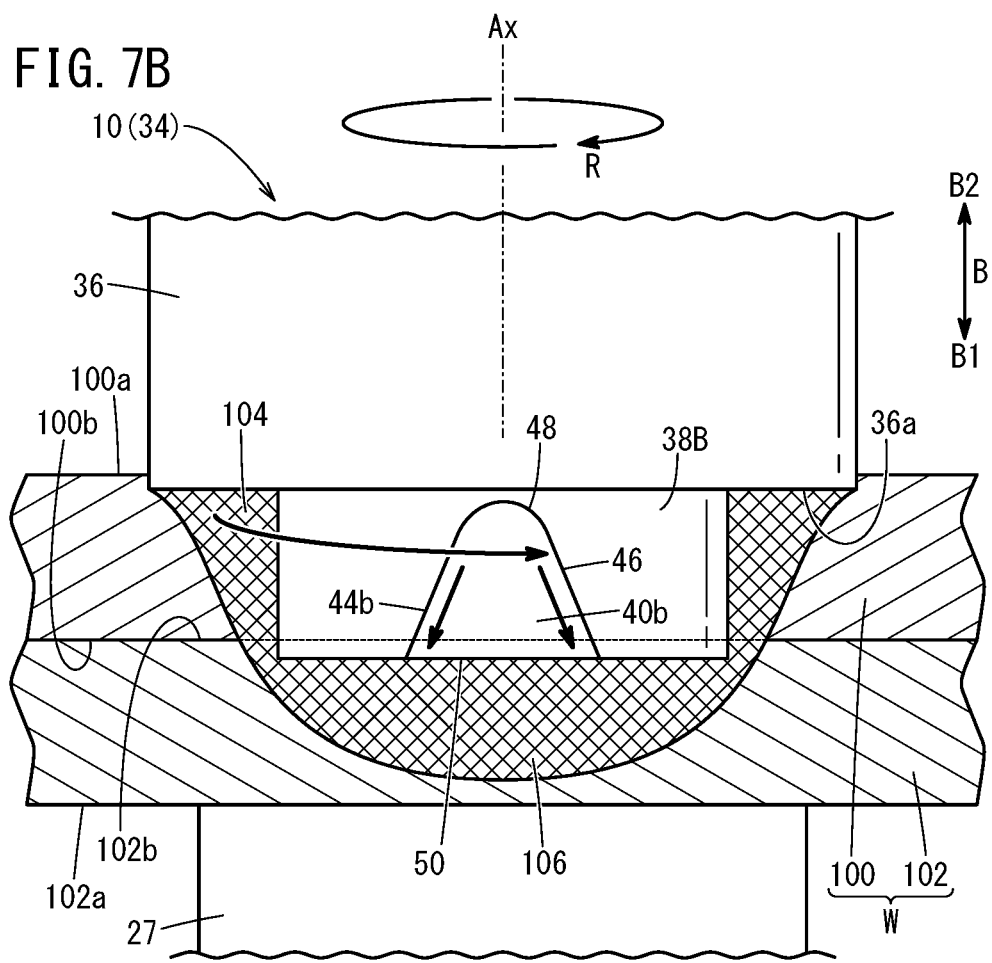
FIG. 7B is cross sectional view showing lap welding using the friction stir welding tool in FIG. 7A.

In the structure, as shown in FIG. 7B, the first softened material 104 taken into the outer circumferential recess 40b can flow toward the front end of the probe 38B along both of the first outer circumferential edge 44b and the second outer circumferential edge 46 by the rotation force of the probe 38B. Accordingly, it is possible to improve the efficiency of stirring the first softened material 104 and the second softened material 106 together.

The present invention is not limited to the above described embodiments. It is a matter of course that various modifications may be made without departing from the gist of the present invention.

The welding tool 10 may be configured to perform lap welding of a workpiece W which comprises three or more plate members that are stacked together. The welding tool 10 may be used in butt welding, where end surfaces of two plate members are brought into abutment with each other, and the abutting portions are welded together by friction stir welding. The probe 38, 38A, 38B may have one, two or four or more outer circumferential recesses 40, 40a, 40b.

The above embodiments are summarized as follows:

The above embodiments disclose the friction stir welding tool (10). The friction stir welding tool (10) includes the probe (38, 38A, 38B) having the front end surface (38a) and the outer circumferential surface (38b). The outer circumferential surface (38b) has, formed therein, the outer circumferential recess (40, 40a, 40b) extending to the front end surface (38a) along the rotation axis (Ax) of the probe (38, 38A, 38B), and the friction stir welding tool (10) is configured to rotate the probe (38, 38A, 38B) about the rotation axis (Ax), and embed the probe (38, 38A, 38B) inside the workpiece (W) during rotation of the probe (38, 38A, 38B) to thereby weld the workpiece (W). The width of the outer circumferential recess (40, 40a, 40b) is increased toward the front end of the probe (38, 38A, 38B).

In the above described friction stir welding tool (10), the outer circumferential surface (38b) may include the first outer circumferential edge (44) configured to form the edge portion of the outer circumferential recess (40) that is positioned on the forward side in the rotation direction of the probe (38), and the second outer circumferential edge (46) configured to form the edge portion of the outer circumferential recess (40) that is positioned on the backward side in the rotation direction of the probe (38), and the first outer circumferential edge (44) may extend along the rotation axis (Ax), and the second outer circumferential edge (46) may extend toward the front end of the probe (38) with inclination toward the backward side in the rotation direction of the probe (38).

In the above described friction stir welding tool (10), the outer circumferential surface (38b) may include the first outer circumferential edge (44a) configured to form the edge portion of the outer circumferential recess (40a) that is positioned on the forward side in the rotation direction of the probe (38A) and the second outer circumferential edge (46a) configured to form the edge portion of the outer circumferential recess (40a) that is positioned on the backward side in the rotation direction of the probe (38A), and the first outer circumferential edge (44a) may extend toward the front end of the probe (38A) with inclination toward the forward side in the rotation direction of the probe (38A), and the second outer circumferential edge (46a) may extend along the rotation axis (Ax).

In the above described friction stir welding tool (10), the outer circumferential surface (38b) may include the first outer circumferential edge (44b) configured to form the edge portion of the outer circumferential recess (40b) that is positioned on the forward side in the rotation direction of the probe (38B), and the second outer circumferential edge (46) configured to form the edge portion of the outer circumferential recess (40b) that is positioned on the backward side in the rotation direction of the probe (38B), and the first outer circumferential edge (44b) may extend toward the front end of the probe (38B) with inclination toward the forward side in the rotation direction of the probe (38B), and the second outer circumferential edge (46) may extend toward the front end of the probe (38B) with inclination toward the backward side in the rotation direction of the probe (38B).

In the above described friction stir welding tool (10), the outer circumferential surface (38b) may include the third outer circumferential edge (48) configured to couple the proximal end of the first outer circumferential edge (44, 44a, 44b) and the proximal end of the second outer circumferential edge (46, 46a), the third outer circumferential edge (48) being curved so as to be convex toward the proximal end of the probe (38, 38A, 38B).

In the above described friction stir welding tool (10), the outer circumferential recess (40, 40a, 40b) may include a plurality of outer circumferential recesses provided in the circumferential direction of the probe (38, 38A, 38B).

What is claimed is:

1. A friction stir welding tool comprising a probe having a front end surface and an outer circumferential surface, the outer circumferential surface including, formed therein, an outer circumferential recess extending to the front end surface along a rotation axis of the probe, the friction stir welding tool being configured to rotate the probe about the rotation axis and embed the probe inside a workpiece during rotation of the probe to thereby weld the workpiece,
   wherein the outer circumferential surface includes:
   a first outer circumferential edge configured to form an edge portion of the outer circumferential recess that is positioned on a forward side in a rotation direction of the probe;
   a second outer circumferential edge configured to form an edge portion of the outer circumferential recess that is positioned on a backward side in the rotation direction of the probe; and
   a third outer circumferential edge configured to couple a proximal end of the first outer circumferential edge and a proximal end of the second outer circumferential edge, the third outer circumferential edge being curved so as to be convex toward a proximal end of the probe, and
   wherein the first outer circumferential edge extends straight from one end of the third outer circumferential edge to the front end surface,
   the second outer circumferential edge extends straight from another end of the third outer circumferential edge to the front end surface,
   an interval between the first outer circumferential edge and the second outer circumferential edge increases toward a front end of the probe,
   one of the first outer circumferential edge and the second outer circumferential edge extends in parallel to the rotation axis of the probe, and
   another one of the first outer circumferential edge and the second outer circumferential edge extends toward the front end of the probe with inclination toward the forward or backward side in the rotation direction of the probe.

2. The friction stir welding tool according to claim 1,
   wherein the first outer circumferential edge extends along the rotation axis; and
   the second outer circumferential edge extends toward the front end of the probe with inclination toward the backward side in the rotation direction of the probe.

3. The friction stir welding tool according to claim 1,
   wherein the first outer circumferential edge extends toward the front end of the probe with inclination toward the forward side in the rotation direction of the probe; and
   the second outer circumferential edge extends along the rotation axis.

4. The friction stir welding tool according to claim 1, wherein the outer circumferential recess comprises a plurality of outer circumferential recesses provided in a circumferential direction of the probe.

5. A friction stir welding tool comprising a probe having a front end surface and an outer circumferential surface, the outer circumferential surface including, formed therein, an outer circumferential recess extending to the front end surface along a rotation axis of the probe, the friction stir welding tool being configured to rotate the probe about the rotation axis and embed the probe inside a workpiece during rotation of the probe to thereby weld the workpiece, wherein the outer circumferential surface includes:

a first outer circumferential edge configured to form an edge portion of the outer circumferential recess that is positioned on a forward side in a rotation direction of the probe;

a second outer circumferential edge configured to form an edge portion of the outer circumferential recess that is positioned on a backward side in the rotation direction of the probe; and a third outer circumferential edge configured to couple a proximal end of the first outer circumferential edge and a proximal end of the second outer circumferential edge, the third outer circumferential edge being curved so as to be convex toward a proximal end of the probe, and wherein the first outer circumferential edge extends straight from one end of the third outer circumferential edge to the front end surface, the second outer circumferential edge extends straight from another end of the third outer circumferential edge to the front end surface, an interval between the first outer circumferential edge and the second outer circumferential edge increases toward a front end of the probe, the first outer circumferential edge extends toward the front end of the probe with inclination toward the forward side in the rotation direction of the probe, and the second outer circumferential edge extends toward the front end of the probe with inclination toward the backward side in the rotation direction of the probe.

6. The friction stir welding tool according to claim 5, wherein the outer circumferential recess comprises a plurality of outer circumferential recesses provided in a circumferential direction of the probe.

* * * * *